Patented Oct. 8, 1946

2,409,039

UNITED STATES PATENT OFFICE 2,409,039

HALOGENATED COMPOUNDS AND PROCESS FOR MAKING SAME

Edgar E. Hardy, Anniston, Ala., and Gennady M. Kosolapoff, Dayton, Ohio, assignors to Monsanto Chemical Company, a corporation of Delaware No Drawing. Application January 28, 1944, Serial No. 520,100

14 Claims. (Cl. 260—461)

This invention relates to dialkyl phosphate derivatives and to a process for preparing same.

The invention has as its object the production of dialkyl fluorophosphates by a process which comprises reacting an aliphatic alcohol with phosphorus trichloride to form a dialkyl hydrogen phosphite, chlorinating the crude product and then fluorinating the dialkyl chlorophosphate formed by means of an alkali fluoride to produce the corresponding dialkyl fluorophosphate.

Another object is to provide a process for preparing dialkyl chlorophosphates either in a substantially pure condition or in the form of a crude reaction mixture containing same, which mixture is stabilized against the development of side reactions and is, therefore, particularly suitable for use in the fluorinating step of the above process.

Another object is to provide a process for producing dialkyl chlorophosphates in substantially pure form and in very high yields, for example in yields varying from 80 to as high as 95% of theory.

A particular object of the invention is to provide a commercially feasible process of preparing dialkyl fluorophosphates which produces an overall product yield of from 67 to better than 80% of theory based on the amount of phosphorus trichloride reacted and a product of better than 95% purity.

A further object is to provide a process for making dialkyl fluorophosphates wherein the costly and time consuming steps of removing the by-products of each stage of the reaction are eliminated.

Another object is to provide a process for making dialkyl fluorophosphates wherein the alcohol-phosphorus trichloride reaction product may be chlorinated directly without first removing the hydrogen chloride and alkyl chlorides from the crude reaction product.

Still another object is to provide an improved process for making dialkyl fluorophosphates in which the hydrogen chloride formed in the esterification and chlorination reactions is substantially completely removed by sweeping the crude chlorinated product with benzene, carbon tetrachloride or any other suitable inert solvent, thereby stabilizing the crude chlorinated product against decomposition and the development of side reactions which are to a large degree responsible for the low product yields of the prior art processes.

A further object is to provide a process for preparing dialkyl fluorophosphates in which the crude chlorinated product is sweetened by sweeping with an inert solvent such as benzene or carbon tetrachloride, thereby obviating the necessity of chemical treatment with basic lead carbonate and subsequent filtration.

Other objects and advantages will be apparent to those skilled in the art as the description proceeds.

According to the known method of preparing dialkyl fluorophosphates, aliphatic alcohols are reacted with phosphorus trichloride to form dialkyl hydrogen phosphites which are isolated and chlorinated to form a crude product containing dialkyl chlorophosphates. The latter compounds are then isolated and treated with a fluorinating agent such as sodium fluoride to form the corresponding fluorophosphates.

These reactions may be represented by the following equations in which R represents a saturated aliphatic hydrocarbon radical:

$$3ROH + PCl_3 \rightarrow (RO)_2POH + RCl + 2HCl$$
$$(RO)_2POH + Cl_2 \rightarrow (RO)_2POCl + HCl$$
$$(RO)_2POCl + NaF \rightarrow (RO)_2POF + NaCl$$

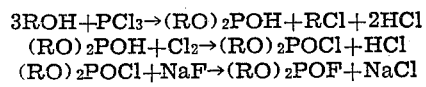

The known method has been in the nature of a laboratory curiosity since it has many decided disadvantages which render it commercially impractical. For example, this method requires that the hydrogen chloride be removed from the chlorinated product by treatment with basic lead carbonate or some other compound which will neutralize the acid and form an insoluble compound which may be removed by filtration. This is objectionable because it adds another step to the method and also because the compound added has the tendency to reduce the purity and the yield of the final product. This method also requires that the intermediate products be isolated in a substantially pure form by separate distillations, which operations are time-consuming and yield distillates from which it is not possible to obtain complete conversion Now we have found that the known method of making dialkyl fluorophosphates is much simplified by chlorinating the crude phosphorus trichloride—aliphatic alcohol reaction product and fluorinating the crude product thus formed without attempting to purify the intermediates by distillation. We have also made the important discovery that if the crude chlorinated reaction product is swept free of HCl by means of benzene, carbon tetrachloride or another suitable inert solvent, it is stabilized against the development of side reactions. This stabilizing step has the desirable effect of markedly increasing the yield and purity of not only the chlorophosphate but also the final product.

Broadly stated, our invention comprises forming dialkyl hydrogen phosphites by reacting phosphorus trichloride with aliphatic alcohols and then chlorinating the crude product to form dialkyl chlorophosphates.

More specifically, our invention comprises forming alkyl hydrogen phosphites by reacting phosphorus trichloride with aliphatic alcohols, chlorinating the crude product to produce dialkyl chlorophosphates and then reacting said chlorophosphate with an alkali fluoride to form the corresponding fluorophosphate.

Still more specifically, our invention comprises forming a dialkyl hydrogen phosphite by reacting phosphorus trichloride with an aliphatic alcohol, chlorinating the crude product to form a mixture including a dialkyl chlorophosphate and hydrogen chloride, removing the hydrogen chloride and fluorinating the product by means of sodium fluoride or any other suitable alkali fluoride to form the corresponding fluorophosphate.

Our invention is illustrated but not limited by the following examples:

Example 1

Phosphorus trichloride (412 g., 3 moles) was gradually introduced during a period of 330 minutes into substantially anhydrous methyl alcohol (294 g., 9 moles plus 2% excess) contained in a reactor equipped with a stirrer, thermometer and vacuum connection. During this operation the reaction mixture was stirred and maintained at a temperature of $-5$ to $-2°$ C. As soon as the introduction of phosphorus trichloride was completed, the crude reaction product was subjected to a pressure of 50 to 200 millimeters of mercury and chlorinated for 255 minutes at $-5$ to $0°$ C. until a slight excess of chlorine remained in the mixture. At the end of the chlorination reaction approximately twice the volume of carbon tetrachloride was added and the application of reduced pressure was continued to sweep out the hydrogen chloride. The temperature of the reaction mixture was then raised slowly to $45°$ C. to remove the remainder of the unvaporized solvent. The product thus obtained was distilled at a reduced pressure of about 4 millimeters of mercury and at a temperature of $60°$ C. to yield a product consisting of 407.6 grams of dimethyl chlorophosphate. This represents a product yield of 94% of theory, basis $PCl_3$.

Example 2

Phosphorus trichloride (206 g., 1.5 moles) was gradually added with vigorous stirring to substantially anhydrous methyl alcohol (147 g., 4.5 moles plus 2% excess) during a period of 210 minutes, the temperature of the reaction being maintained within the range of $0°$ to $5°$ C. When the addition of phosphorus trichloride was completed, 300 c. c. of benzene was added and the stirring was continued for an additional 60 minutes, after which the reaction product was brought to a temperature of $5°$ C. The reaction product was then subjected to a reduced pressure of 50 to 200 millimeters of mercury and chlorinated for 300 minutes at a temperature of $0°$ to $5°$ C. until a slight excess of chlorine remained in the mixture. At the end of the chlorination reaction, the reduced pressure was maintained to allow the solvent to sweep the hydrogen chloride from the chlorinated reaction product. Then the temperature of the reaction product was gradually raised to $50°$ C. to distill off the remainder of the solvent. The solvent-free product was distilled at a temperature of 75 to $80°$ C. under a pressure of 20 to 25 millimeters of mercury and a distillate was collected consisting of 377.3 grams of dimethyl chlorophosphate which represents a yield of 87% of theory, basis $PCl_3$.

Example 3

Phosphorus trichloride (206 g., 1.5 moles) was slowly mixed with substantially anhydrous methyl alcohol (147 g., 4.5 moles plus 2% excess) during a period of 210 minutes. The reaction mixture was actively stirred during the mixing and the temperature was maintained at 7 to $8°$ C. After the mixing was completed, the reaction mixture was stirred an additional 45 minutes at a temperature of $5°$ C. to complete the reaction. Then the crude reaction product was subjected to a pressure of 50 to 200 millimeters of mercury and chlorinated at a temperature of 7 to $8°$ C. until a slight excess of chlorine remained in the mixture, after which 300 c. c. of benzene was added and the hydrogen chloride swept from the chlorinated product by the continued application of reduced pressure. The temperature of the sweetened chlorinated product was then elevated slowly to $45°$ C. to distill off the remainder of the solvent. The product remaining in the reactor was distilled at a temperature of 75 to $80°$ C. under a pressure of 20 to 25 millimeters of mercury and a distillate was collected which constisted of 368.6 grams of dimethyl chlorophosphate, a yield of 85% of theory, basis $PCl_3$.

Example 4

Phosphorus trichloride (206 g., 1.5 moles) was gradually added to substantially anhydrous methyl alcohol (147 g., 4.5 moles plus 2% excess) dissolved in 233 c. c. of benzene and contained in a jacketed reactor equipped with a stirrer, thermometer and vacuum connection. A slight negative pressure (700 mm.) was applied to remove any HCl fumes. The reaction mixture was vigorously stirred and cooled so as to maintain the reaction temperature within the range of 0 to $5°$ C. The mixture was stirred an additional 45 minutes at $0°$ C., after which it was subjected to a pressure of 50 to 200 millimeters of mercury and chlorinated for 135 minutes at a temperature of $0°$ to $5°$ C. until a slight excess of chlorine remained in the mixture. At the end of this reaction the application of reduced pressure was continued until the hydrogen chloride was swept from the reaction product by the vaporized benzene.

After the removal of the hydrogen chloride, 166 c. c. of benzene and 75 grams of 95% NaF were added and the reaction mixture was maintained for 35 minutes at a temperature in the range of 77 to $80°$ C. The reaction product was filtered and the filter cake was washed with 500 c. c. of dry benzene. The benzene was removed from the combined filtrate and washings by distillation. The solvent-free product was vacuum distilled to produce 129 grams of dimethyl fluorophosphate, a yield of 67% of theory, basis phosphorus trichloride.

Example 5

Phosphorus trichloride (137.4 g., 1 mole) was gradually added with vigorous stirring to substantially anhydrous isopropyl alcohol (183.8 g., 3 moles plus 2% excess) contained in a suitable reactor provided with a stirrer, thermometer and vacuum connection. The reaction mixture was cooled by means of an ice-salt bath, the temperature of the reaction being maintained at 10 to 15° C. At the completion of the reaction the crude reaction product was chlorinated at a temperature of about 10° C. until a temperature drop indicated the end of the reaction, after which an equal volume of benzene was added and the crude chlorinated product was swept free of hydrogen chloride by the application of reduced pressure of about 30 to 200 millimeters of mercury. After prolonged sweeping with benzene vapors, the temperature of the crude chlorinated product was gradually raised to 50° C. and the remaining benzene was removed by distillation. After the removal of benzene, the product was distilled under a pressure of 3 millimeters of mercury and 191 grams of diisopropyl chlorophosphate was collected, a yield of 95% of theory, basis PCl$_3$.

*Example 6*

Phosphorus trichloride (708 g., 5.15 moles) was added slowly to 937 g. (15.61 moles) of carefully dried isopropanol contained in a suitable reactor, equipped with a stirrer, thermometer and vacuum connection. A slight negative pressure was applied and maintained throughout the reaction to remove any hydrogen chloride fumes. The reaction mixture was cooled in an ice-salt mixture and maintained at a temperature between 10° and 12° C. The time of addition of the trichloride was 30 minutes. The cold reaction mixture was stirred for an additional 30 minutes and then chlorinated by introducing gaseous chlorine for a period of about 30 minutes, the temperature of the reaction being maintained at less than 15° C. by the application of a vacuum. Benzene (300 c. c.) was then added and the crude chlorinated product swept free of acid by the application of a vacuum, the benzene being condensed in a dry ice trap. An additional 400 c. c. of dry benzene was added and the bulk of this solvent distilled off under vacuum to sweep out the last traces of HCl from the crude chlorophosphate.

Sodium fluoride (600 g. of 95% NaF) and 540 c. c. of benzene were added and the reaction mixture was raised to refluxing temperature in about 80 minutes and refluxed at 94 to 96° for four hours with good agitation. After standing over night, the reaction mixture was filtered and the filter cake washed with 500 c. c. of dry benzene. The benzene was removed from the combined filtrate and washings by distillation and the residue was vacuum distilled to separate the diisopropyl fluorophosphate formed. The product weighed 732 g. and the yield of theory, basis PCl$_3$, was 82.5%.

*Example 7*

212 pounds (3.54 pound-moles) of isopropanol containing less than 0.2 per cent by weight of water was cooled with brine to −5° C. in a jacketed reactor. 160 pounds (1.16 pound moles) of phosphorus trichloride was gradually added to the isopropanol with cooling and stirring during a period of four hours. The temperature of the reaction was not allowed to exceed 12° C. and the system was maintained under slight negative pressure (about 700 mm.) to remove undesirable vapors.

After completion of the addition, the mixture was stirred for one-half hour and then subjected to a pressure of 12 to 100 millimeters of mercury. Chlorine was then passed into the crude reaction product at a rate of 12 pounds per hour, the temperature of the reaction being kept below 12° C. by brine cooling. The end of the reaction was indicated by a temperature drop which occurred after a total of 122 pounds of chlorine (1.72 pound moles, 48 per cent excess) was used.

To remove excess chlorine, hydrogen chloride and isopropyl chloride, the well stirred mixture was subjected to a pressure of 12 to 100 millimeters of mercury for two hours. The temperature was gradually raised to 20° C. during this time by passing steam into the jacket of the reactor. Ten gallons of benzene was then added and distilled off under reduced pressure, gradually raising the temperature of the reaction mixture to 30° C. The last traces of hydrogen chloride were removed by adding an additional ten gallons of benzene which was distilled off under reduced pressure at reactor temperatures not exceeding 50° C. The total time required for the removal of the volatile acid components of the reaction mixture was 4 hours.

The mixture was then cooled to 20° C. and 19 gallons of benzene was added. This was followed by the introduction of 123.5 pounds (2.80 pound moles) of dry powdered sodium fluoride (95% pure). The mixture was stirred and heated to the refluxing temperature in a period of 1 hour and held at this temperature (95–98° C.) for 4 hours. The product that obtained was cooled and filtered to yield a filter cake which was washed with three 5-gallon portions of benzene. The filtrate and washing were then combined and distilled under reduced pressure. There was obtained 158 pounds (74 per cent yield of theory based on PCl$_3$) of diisopropyl fluorophosphate, boiling point 62° C. at 9 mm. and 46° C. at 5 mm.; analysis: F, 10.20%, theory 10.33%; Cl, 0.10%, theory 0.00%.

In the first step of our process in which phosphorus trichloride is reacted with an aliphatic alcohol to form the corresponding dialkyl hydrogen phosphite, the optimum temperature for the reaction varies with the number of carbon atoms contained in the alkyl chain of the alcohol. For the dimethyl compound the reaction temperature should fall substantially within the range of −15° C. to 5° C., but it should be understood that the use of higher or lower temperatures is within the scope of our invention. For producing diisopropyl hydrogen phosphite a temperature of from 10° C. to 15° C. should be employed, but here also much lower temperatures produce satisfactory results. Short temperature rises to no more than 20° C. do not materially affect the yield, but higher temperatures should be avoided as long as large amounts of HCl are present since this favors side reactions.

With regard to the quantities of reagents employed in this reaction, a slight excess of the theoretical amount of alcohol required to form the desired phosphite should be used. Generally 1 to 10% excess is satisfactory, but more or less alcohol may be employed so long as the theoretical requirements are met.

In the manufacture of dialkyl chlorophosphates the chlorination temperature varies with the dialkyl hydrogen phosphite being treated and also with the amount and type of solvent used. In chlorinating dimethyl hydrogen phosphite the reaction should take place at a temperature substantially within the range of −5° C. to 8° C. and preferably at a temperature below 5° C. In the chlorination of the diisopropyl compound the reaction should be effected at a temperature of from about 0° C. to about 20° C. The most satisfactory results, however, are obtained at a temperature within the range of 10° C. to 15° C. In the production of either dimethyl or diisopropyl chlorophosphate much lower reaction temperatures may be employed if desired.

The use of reduced pressure in the chlorination reaction is desirable as it aids in controlling the temperature and at the same time facilitates removal of undesirable vapors, but it should be understood that this method of operation is not essential as yields as high as 89% of theory, basis PCl₃, are obtainable at atmospheric pressure if efficient cooling means are provided.

The sweetening step involving the removal of HCl from the crude chlorophosphate mixture is desirably carried out by adding benzene, carbon tetrachloride or another suitable solvent which decreases the solubility of the HCl in the mixture and then sweeping out the acid by solvent vapors produced by distillation, preferably by vacuum distillation. The sweeping operation is initiated at a relatively low temperature which is gradually increased until all the acid has been removed, care being taken to avoid raising the temperature to a point where substantial decomposition of the chlorophosphates takes place.

For example, when sweetening crude mixtures containing dimethyl chlorophosphate or diisopropyl chlorophosphate, the sweeping operation should begin at a temperature of −15° C. or a lower temperature, which temperature is gradually raised to a maximum of 50° C. until the solvent vapors sweep the mixture free of hydrogen chloride.

It should be understood, however, that the starting temperature of the sweeping operation will vary with the amount of HCl present in the crude chlorophosphate mixture and with the chlorophosphate mixture being sweetened. If substantial amounts of HCl are present, then a starting temperature of −15° C. or a lower temperature must be employed, but if only relatively small amounts of HCl are present, then the sweetening step may be initiated at somewhat higher temperatures.

In general the solvent is employed in quantities varying from one-third to twice the volume of the reaction mixture, but more or less solvent may be employed if desired.

In the preparation of dimethyl fluorophosphate a solvent is employed in each of the following steps:

Step 1: $3CH_3OH + PCl_3 \rightarrow$
$(CH_3O)_2POH + CH_3Cl + 2HCl$
Step 2: $(CH_3O)POH + Cl_2 \rightarrow (CH_3O)_2POCl + HCl$
Step 3: Sweetening step
Step 4: $(CH_3O)_2POCl + $ alkali
fluoride $\rightarrow (CH_3O)_2POF + $ alkali chloride When step 1 is carried out at a temperature above 0° C., it is desirable to use a solvent, however, at lower temperatures, that is below 0° C., a solvent is unnecessary. In any event, a solvent should be added prior to or after the chlorination step so that the sweetening step can be executed.

If an undesirable amount of solvent is removed by the sweetening step, an additional quantity may be added to supply enough solvent for step 4. If desired a sufficient amount of solvent may be used in step 1 to take care of the requirements of steps 2, 3 and 4.

When preparing diisopropyl fluorophosphate, a solvent is preferably added to the crude mixture just prior to or after the chlorination step, the use of a solvent in step 1 generally being unnecessary and undesirable. However, it is within the scope of our invention to use a solvent in all four steps and when this is done a sufficient amount of solvent to meet the requirements of steps 2, 3 and 4 may be employed in step 1.

As an alternative to the above-indicated method of sweetening the crude chlorinated reaction product, it may be first swept with nitrogen or another suitable inert gas and then treated with a solvent in the manner described to remove the last traces of hydrogen chloride.

The sweetening step is one of the critical features of our invention as it is absolutely essential to effectively remove the hydrogen chloride formed in the esterification and chlorination reactions in order to prevent the development of side reactions which markedly decrease the yield of the dialkyl chlorophosphates and hence the yield of the final product, the dialkyl fluorophosphates.

In the fluorinating step of our process a quantity varying from a slight excess to a large excess of one molecular proportion of alkali fluoride per molecular proportion of dialkyl chlorophosphate may be used, but for obvious reasons it is desirable to use only a slight excess of alkali fluoride. Satisfactory results are obtained by using about 1.14 moles of alkali fluoride per mole of chlorophosphate.

In fluorinating dimethyl chlorophosphate the reaction is preferably carried out in the presence of benzene, carbon tetrachloride or another suitable inert solvent and at a temperature within the range of 70 to 80° C. For producing the corresponding diisopropyl fluorophosphate a similar inert solvent and a reaction temperature of from 90 to 100° C. should be employed. Higher or lower temperatures are within the scope of our invention, but if temperatures lying outside the above ranges are employed a lower yield is obtained.

In place of sodium fluoride, water-soluble alkali fluorides such as $NH_4F$, $NH_4F \cdot HF$ and $KF \cdot 2H_2O$ may be used in fluorinating the dialkyl chlorophosphates higher in the series than dimethyl chlorophosphate. Soluble fluorides are not desirable for fluorinating dimethyl chlorophosphate because these fluorides are soluble in the product and can be separated therefrom only with great difficulty.

When using soluble fluorides these compounds are dissolved in water. To the solution thus formed the crude chloro-compound is added with vigorous stirring at room temperature. After the addition is completed, stirring is continued for a short time to make certain that the reaction has gone to completion. The oil layer is separated and the aqueous layer extracted with benzene, carbon tetrachloride or another suitable solvent. The solvent is then combined with the oil and the solution thus produced is washed free of chloride ion with water. The washed solution is then distilled at the pressure and temperature required to separate the desired fluorophosphate.

In the final step of my process the fluorophosphate compounds may be separated from the crude reaction product of the chlorophosphate and the alkali fluoride by any one of four methods.

The preferred method comprises adding an inert hydrocarbon solvent consisting essentially of a mixture of hydrogenated terphenyls, particularly those mixtures boiling above about 330° C., to the crude reaction product and then vacuum distilling the resulting slurry. This operation leaves a fluid residue from which the hydrocarbon mixture may be readily recovered. The recovery of the hydrocarbon mixture involves washing the fluid residue first with a dilute aqueous sodium hydroxide solution and then with water, after which the washed product is warmed to separate most of the water and then heated to 150° C. under a pressure of 60 millimeters of mercury to finally dry the product.

Generally about 3 c. c. of the hydrocarbon mixture for each gram of alkali fluoride is required in this method of operation, but a larger or smaller quantity may be used, the only requirement being that a sufficient amount must be used to give a fluid residue which may be readily removed from its container.

While this method of separation has been described with particular reference to the use of a solvent such as a mixture of hydrogenated terphenyls, it should be clearly understood that any inert organic solvent boiling at a temperature sufficiently above the boiling point of the product to permit efficient fractionation may be employed.

Another method involves filtration and distillation, which method is described in Examples 4, 6 and 7. The only requirement here is that the distillation should be carried out at a reduced pressure substantially in the range of 2 to 30 mm. and at a temperature at which substantial decomposition is avoided.

The third method involves extracting the inorganic salts by washing the crude reaction mixture with water, separating the aqueous and solvent layers, extracting the aqueous layer with a solvent, combining the solvent extracts and then vacuum distilling the combined extracts. This method is not applicable to the separation of dimethyl fluorophosphate since this compound is soluble in water.

The fourth method comprises distilling the product directly from the crude fluorophosphate slurry. This is accomplished in a still provided with an agitator which is preferably operated near the end of the distillation to facilitate complete removal of the fluorophosphates from the still residue.

While the above cited examples have been limited to the description of the dimethyl and diisopropyl hydrogen phosphites and the corresponding chloro- and fluorophosphates, it should be understood that the production of other dialkyl halophosphates is within the scope of our invention.

The compounds produced in accordance with this invention have the following general formulae:

(RO)$_2$POX, where R is an alkyl chain, preferably an alkyl chain containing 1 to 6 carbon atoms and X is selected from the group consisting of chlorine and fluorine.

Of these compounds, the dimethyl and the diisopropyl derivatives are particularly useful in chemical warfare as such or as intermediates in the production of compounds suitable for this purpose.

The foregoing detailed description has been given for clearness of understanding only and no unnecessary limitations should be understood therefrom, but the appended claims should be construed as broadly as permissible in view of the prior art.

What we claim is:

1. The process for manufacturing dialkyl phosphate derivatives which comprises reacting an aliphatic alcohol with phosphorus trichloride to form a crude product containing a dialkyl hydrogen phosphite and then chlorinating said product to produce the corresponding dialkyl chlorophosphate.

2. The process for manufacturing dialkyl phosphate derivatives which comprises reacting an aliphatic alcohol with phosphorus trichloride at a temperature of from −15° C. to 20° C. to form a crude product containing a dialkyl hydrogen phosphite, chlorinating said product to produce a crude mixture containing the corresponding dialkyl chlorophosphate and hydrogen chloride, removing said hydrogen chloride from said mixture and then recovering said chlorophosphate.

3. The process for manufacturing dialkyl phosphate derivatives which comprises reacting an aliphatic alcohol with phosphorus trichloride to form a crude reaction product containing a dialkyl hydrogen phosphite, chlorinating said product under reduced pressure to produce a crude mixture containing the corresponding dialkyl chlorophosphate and hydrogen chloride, removing said hydrogen chloride from said mixture by distillation in the presence of an inert solvent and then recovering said chlorophosphate.

4. The process for manufacturing dialkyl phosphate derivatives which comprises reacting an aliphatic alcohol with phosphorus trichloride to form a crude product containing a dialkyl phosphite, chlorinating said product to produce a crude mixture containing the corresponding dialkyl chlorophosphate and hydrogen chloride, removing said hydrogen chloride from said mixture, reacting said chlorophosphate with an alkali fluoride and then recovering the dialkyl fluorophosphate thus formed.

5. The process defined in claim 4 wherein methyl alcohol is the alcohol employed.

6. The process defined in claim 4 wherein isopropyl alcohol is the alcohol employed.

7. The process for manufacturing dialkyl fluorophosphates which comprises reacting about three moles of an aliphatic alcohol with about one mole of phosphorus trichloride at a temperature of from −15° C. to 20° C., chlorinating the resulting crude product to produce a crude mixture containing a dialkyl chlorophosphate and hydrogen chloride, removing said hydrogen chloride by vacuum distillation in the presence of a volatile inert solvent, reacting said chlorophosphate with an alkali fluoride and then recovering the corresponding fluorophosphate.

8. The process defined in claim 7 wherein the chlorination is carried out under reduced pressure.

9. The process defined in claim 7 wherein the fluorophosphate is recovered by distillation in the presence of a high-boiling inert organic solvent.

10. The process defined in claim 7 wherein the fluorophosphate is recovered by distillation in the presence of a hydrocarbon solvent consisting essentially of hydrogenated terphenyls.

11. The process for manufacturing dialkyl fluorophosphates which comprises reacting an aliphatic alcohol with phosphorus trichloride at a temperature of from −15° C. to 20° C. to form a crude product containing a dialkyl hydrogen phosphite, chlorinating said crude product under reduced pressure and at a temperature of from −5° C. to 20° C. to produce a crude mixture including the corresponding dialkyl chlorophosphate and hydrogen chloride, removing said hydrogen chloride by distillation of said crude mixture in the presence of an inert organic solvent and at a temperature not exceeding 50° C., reacting said chlorophosphate contained in said crude mixture with an alkali fluoride at a temperature of from 70° C. to 100° C., and then recovering the corresponding fluorophosphate.

12. The process for manufacturing dialkyl fluorophosphates which comprises reacting an aliphatic alcohol with phosphorus trichloride at a temperature of from −15° C. to 20° C. to form a crude product containing a dialkyl hydrogen phosphite, chlorinating said crude product under reduced pressure at a temperature of from −5° C. to 20° C. to produce a crude mixture including the corresponding dialkyl chlorophosphate and hydrogen chloride, removing said hydrogen chloride by vacuum distillation of said crude mixture in the presence of an inert organic solvent and at a temperature which is gradually increased from a point within the range of from −15° C. to 15° C. up to a maximum of 50° C., reacting said chlorophosphate contained in said crude mixture with an alkali fluoride at a temperature of from 70° C. to 100° C., and then recovering the corresponding fluorophosphate.

13. The process for manufacturing dimethyl fluorophosphate which comprises reacting methyl alcohol with phosphorus trichloride at a temperature substantially in the range of from −15° C. to 5° C. to produce a crude product containing dimethyl hydrogen phosphite, chlorinating said crude product under reduced pressure and at a temperature of from about −5° C. to about 8° C. to form a crude mixture containing dimethyl chlorophosphate and hydrogen chloride, removing said hydrogen chloride from said crude mixture by distillation in the presence of an inert organic solvent, reacting said chlorophosphate contained in said crude mixture with an alkali fluoride, and then recovering the corresponding fluorophosphate.

14. The process for manufacturing diisopropyl fluorophosphate which comprises reacting isopropyl alcohol with phosphorus trichloride at a temperature of from 10° C. to 20° C. to produce a crude product containing diisopropyl hydrogen phosphite, chlorinating said crude product under reduced pressure and at a temperature of from about 0° C. to about 20° C. to form a crude mixture containing diisopropyl chlorophosphate and hydrogen chloride, removing said hydrogen chloride from said crude mixture by distillation in the presence of an inert organic solvent, reacting said chlorophosphate contained in said crude mixture with an alkali fluoride, and then recovering the corresponding fluorophosphate.

EDGAR E. HARDY.
GENNADY M. KOSOLAPOFF.